United States Patent
Sesha et al.

(10) Patent No.: US 12,101,339 B2
(45) Date of Patent: Sep. 24, 2024

(54) IoT MALWARE CLASSIFICATION AT A NETWORK DEVICE

(71) Applicant: Hewlett Packard Enterprise Development LP, Houston, TX (US)

(72) Inventors: Madhusoodhana Chari Sesha, Karnataka (IN); Ramasamy Apathotharanan, Karnataka (IN); Shree Phani Sundara Banavathi Narayana Sastry, Karnataka (IN); Priyanka Chandrashekar Bhat, Karnataka (IN); Venkatesh Madi, Karnataka (IN); Srinidhi Hari Prasad, Karnataka (IN); Azath Abdul Samadh, Karnataka (IN); Kumar Suresh, Karnataka (IN); Manjunath Rajendra Batakurki, Karnataka (IN); Madhumitha Rajamohan, Karnataka (IN); Ganesh Pagoti, Karnataka (IN); Sriram Mahadeva, Karnataka (IN); Karthik Arumugam, Karnataka (IN); Harish Ramachandran, Karnataka (IN); Fahad Kameez, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 476 days.

(21) Appl. No.: 17/403,213

(22) Filed: Aug. 16, 2021

(65) Prior Publication Data
US 2023/0049886 A1 Feb. 16, 2023

(51) Int. Cl.
*H04L 29/06* (2006.01)
*G06F 18/214* (2023.01)
(Continued)

(52) U.S. Cl.
CPC ........ *H04L 63/1416* (2013.01); *G06F 18/214* (2023.01); *G06N 20/00* (2019.01);
(Continued)

(58) Field of Classification Search
CPC ............. H04L 63/1416; H04L 63/0876; H04L 63/1425; H04L 63/1466; H04L 63/20;
(Continued)

(56) References Cited

U.S. PATENT DOCUMENTS 10,375,096 B2    8/2019    Machlica et al.
10,616,249 B2    4/2020    C et al.
(Continued)

FOREIGN PATENT DOCUMENTS

WO    WO-2018206965 A1 * 11/2018 ......... H04L 63/0876
WO    WO-2023076127 A1 *  5/2023 ........... G06F 21/566

OTHER PUBLICATIONS

Dongmei Bin, Xin Li, Ying Ling, Chunyan Yang, Tong Yu; "Deep Learning Based Malware Traffic Classification for Power Internet of Things Network Security"; ACM; ICBDC '22: Proceedings of the 7th International Conference on Big Data and Computing; May 2022; pp. 131-137 (Year: 2022).*

*Primary Examiner* — Mohammad W Reza
*Assistant Examiner* — Courtney D Fields
(74) *Attorney, Agent, or Firm* — Hewlett Packard Enterprise Development

(57) ABSTRACT

Some examples relate to classifying IoT malware at a network device. An example includes receiving, by a network device, network traffic from an Internet of Things (IoT) device. Network device may analyze network parameters from the network traffic with a machine learning model. In response to analyzing, network device may classify the network traffic into a category of malware activity. Network device may determine an effectiveness of network traffic (Continued)

classification by measuring a deviation of the network parameters from previously trained network parameters that were used for training the machine learning model. In response to a determination that the deviation of the network parameters from the trained network parameters is more than a pre-defined threshold, network device may generate an alert highlighting the deviation, which allows a user to perform a remedial action pertaining to the IoT device.

19 Claims, 5 Drawing Sheets

(51) Int. Cl.
 *G06N 20/00* (2019.01)
 *H04L 9/40* (2022.01)
(52) U.S. Cl.
 CPC ...... *H04L 63/0876* (2013.01); *H04L 63/1425* (2013.01); *H04L 63/1466* (2013.01); *H04L 63/20* (2013.01)

(58) Field of Classification Search
 CPC ... H04L 63/0227; G06F 18/214; G06N 20/00; G06N 5/01; G06N 20/10
 See application file for complete search history.

(56) References Cited

U.S. PATENT DOCUMENTS

| | | | |
|---|---|---|---|
| 11,689,468 B2* | 6/2023 | Koren | G06F 18/24 370/252 |
| 2018/0152467 A1 | 5/2018 | Anderson et al. | |
| 2019/0081980 A1 | 3/2019 | Luo et al. | |
| 2019/0098051 A1 | 3/2019 | Carothers | |
| 2019/0166144 A1* | 5/2019 | Mirsky | G06N 20/20 |
| 2019/0222594 A1* | 7/2019 | Davis, III | H04L 41/14 |
| 2019/0238524 A1 | 8/2019 | Copty et al. | |
| 2020/0106801 A1 | 4/2020 | Evans | |
| 2020/0327222 A1 | 10/2020 | Chhabra et al. | |
| 2023/0209384 A1* | 6/2023 | Pantelidou | H04W 24/10 370/252 |

* cited by examiner

IoT MALWARE CLASSIFICATION AT A NETWORK DEVICE

BACKGROUND

The Internet of Things (IoT) is a system of devices with unique identifiers that allow them to transfer data over a network. The devices may be embedded with sensors, which enable them to collect and exchange data. In the Internet of Things, "things" may refer to a wide variety of devices such as heart monitoring implants, biochip transponders on farm animals, automobiles with built-in sensors, smart lights, smart thermostat systems, and other similar devices that may allow remote monitoring.

Malware, or malicious software, is a program or file that is designed to cause harm to any programmable device or computer network. Malware can perform a variety of functions such as stealing, deleting, or altering data, monitoring users' computer activity, disabling networks, etc. Examples of malware may include computer viruses, worms, ransomware, bots, Trojan horses, and spyware.

BRIEF DESCRIPTION OF THE DRAWINGS

For a better understanding of the solution, examples will now be described, with reference to the accompanying drawings, in which.

DETAILED DESCRIPTION

An IoT device may include a computing device that can sense or read its environment and communicate those readings via a network. Usage of IoT devices is increasing among users considering their utility in performing a wide variety of useful tasks. However, their increased adoption has also made them a target for attackers who may use malware to carry out unauthorized functions such as those mentioned earlier. Considering the threat, organizations are looking for ways to detect and classify malware activity on IoT devices, especially, in an enterprise environment. However, traditional means of enforcing security such as running an end-point security agent on a host may not be directly applicable to IoT devices since they are typically shipped with a proprietary (e.g., manufacturer supplied) firmware or may include closed interfaces (e.g., limited Application Programming Interfaces (APIs)).

Examples disclosed herein address the aforesaid technological challenges by using a network device (e.g., a network switch) to analyze and classify malware activity on an IoT device. In a physical network topology, a network device may be an ideal choice to perform this task since it may be located closest to an IoT device. Thus, examples disclosed herein use a network device to receive network traffic from an IoT device. Pre-defined network parameters are extracted from the network traffic and analyzed using a machine learning model. In response to the analysis, the network device classifies the network traffic into a category of malware activity (e.g., attack, benign, etc.), which may be useful information from a user's (e.g., a network administrator's) perspective. Further, once the classification of network traffic is accomplished, the effectiveness of the classification is determined by measuring a deviation of the network parameters from previously trained network parameters that were used for training the machine learning model. And in response to a determination that the deviation is more than a pre-defined threshold, an alert is generated highlighting the deviation.

The alert may allow a user (e.g., a network administrator) to perform a remedial action pertaining to the IoT device and/or the network device. An example remedial action may include sending a power shutdown event to the IoT device (e.g., through a Power over Ethernet (PoE) system) for shutting down its power supply. The power shutdown may cause erasure of a memory (e.g., RAM) associated with the IoT device, which may result in the removal of malware present therein. In another example, the remedial action may include directing the network device to redirect network traffic to a firewall. In yet another example, the remedial action may include retraining of the machine learning model that was used to analyze the network parameters to improve the accuracy of network traffic classification for malware activity.

Figure 1:
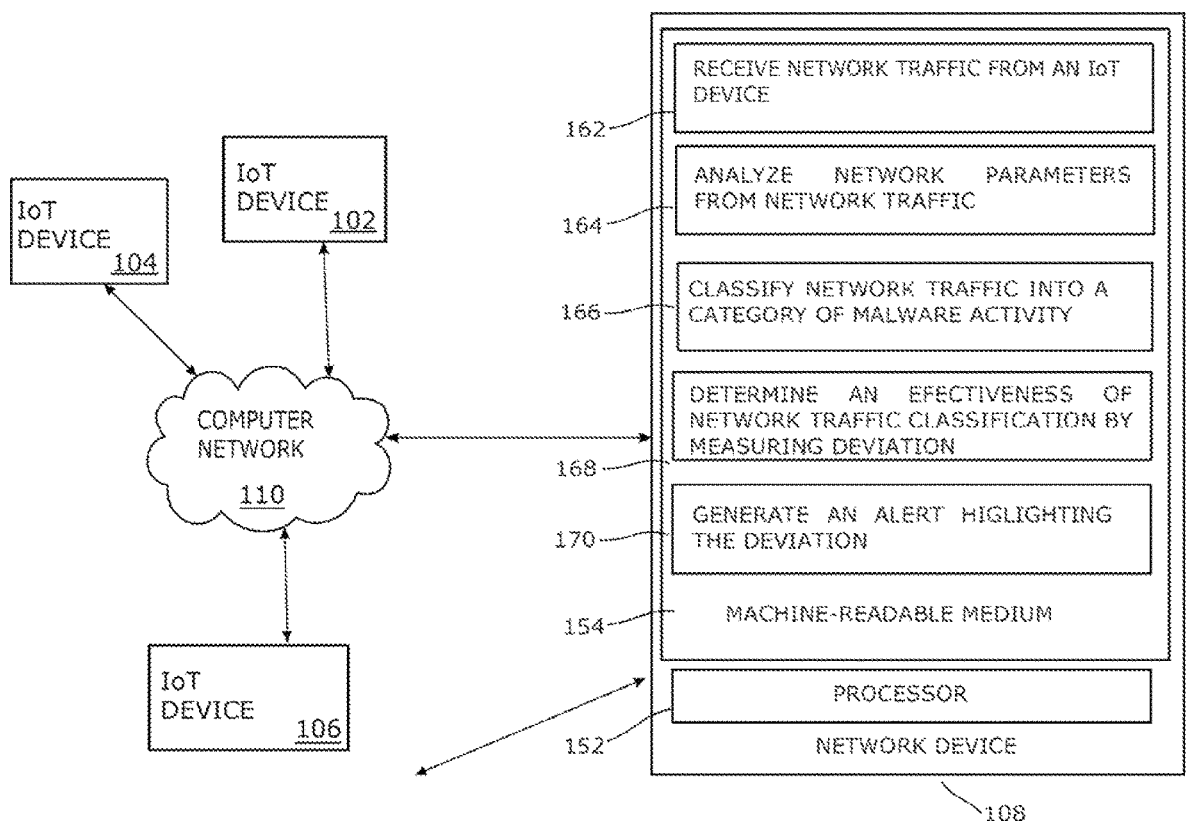
FIG. 1 is a block diagram of a computing environment for classifying IoT malware at a network device, according to some examples.

Referring now to the figures, FIG. 1 is a block diagram of an example computing environment 100 for classifying IoT malware at a network device, according to some examples.

In an example, computing environment 100 may include a first IoT device 102, a second IoT device 104, a third IoT device 106, and a network device 108. Although three IoT devices and one network device are shown in FIG. 1, in other examples of this disclosure, computing environment 100 may include more or fewer than three IoT devices, and more than one network device.

In an example, IoT devices 102, 104, and 106 may each represent a computing device capable of executing machine-readable instructions. For example, IoT devices 102, 104, and 106 may each represent an embedded computing device that transmits and receives information over a network.

Some non-limiting examples of IoT devices 102, 104, and 106 may each include a server, a camera, a printer, an automobile, a clock, a lock, a refrigerator, an enterprise security system, and a coffee maker. IoT devices 102, 104, and 106 may each be a static device based at a fixed location or a mobile device whose location may keep on changing.

Each of the IoT devices 102, 104, and 106 may be communicatively coupled to network device 108, for example, via a computer network 110. The computer network 110 may be a wireless or wired network. The computer network 110 may include, for example, a Wide Area Network (WAN), a Metropolitan Area Network (MAN), a Storage Area Network (SAN), a Campus Area Network (CAN), or the like. Further, the computer network 110 may be a public network (for example, the Internet) or a private network.

Network device 108 may be responsible for receiving, forwarding, and/or routing data along a route in the computer network 110. Examples of network device 108 may include a network switch, a network router, a virtual switch, a virtual router, a VPN concentrator, and a virtual internet gateway.

In an example, the network device 108 may include a processor 152 and a machine-readable storage medium 154 communicatively coupled through a system bus.

In some examples, machine-readable storage medium 154 may store machine-readable instructions (i.e. program code) 162, 164, 166, 168, and 170 that, when executed by processor 152, may at least partially implement some or all functionalities described herein in relation to FIG. 1.

Instructions 162 may be executed by processor 152 to receive network traffic from an IoT device (e.g., 104). Although in the description hereinafter, the functionalities are described with reference to the IoT device 104, similar functionalities may also be performed in respect of other IoT devices such as 102 and 106. In some examples. "to receive" network traffic from the IoT device 104 may include receiving network traffic "sent" by the IoT device 104 to the network device 108. In some examples, "to receive" network traffic from the IoT device 104 may include receiving network traffic "pulled" by the network device 108 from the IoT device 104.

Instructions 164 may be executed by processor 152 to analyze network parameters from the network traffic for malware activity. A user may define the network parameters that are to be analyzed on the network device 108 for malware activity. Examples of network parameters that may be defined may include a total number of packets exchanges between the IoT device 104 and the network device 108, variation in the packet length, inter-packet arrival time (the amount of time that elapses after the receipt of a packet until the next packet arrives), determining whether multiple subflows (using different ports) are present in the network traffic, number of flags in an IP header (e.g., PUSH flag (to ensure that the data is given priority and is processed at the sending or receiving end), SYN flag (used in the first step of connection establishment phase or handshake process between two devices), etc.), and frequency of change in packet length. In some examples, network parameters that may not vary during a sampling of network traffic (e.g., packet length) may be selected for analysis. In some examples, network parameters that may help identify unique network traffic characteristics (e.g., flags in an IP header) may be selected for analysis.

In some examples, instructions 164 to analyze network parameters from the network traffic may include instructions to extract network parameters from the network traffic. Once the network parameters are extracted, instructions 164 may be further executed by processor 152 to apply a machine learning (ML) model to the network parameters to analyze the network traffic for malware activity. Examples of the machine learning model that may be used may include a decision tree classifier model and a support vector machine (SVM) model. In some examples, the machine learning model that is to be applied may be selected based on the network parameters defined earlier. For example, if "x" parameters are defined, then a corresponding ML model "A" (e.g., decision tree classifier model) may be selected. In another example, if "y" parameters are defined, then a related ML model "B" (e.g., SVM model) may be selected.

Before a machine learning model is applied to the network parameters, the machine learning model may be trained with sample network parameters that are similar to the network parameters on which it is to be applied. The sample network parameters that are used for training the machine learning model may be referred to as "trained network parameters".

In response to an analysis of the network parameters with an ML model, instructions 166 may be executed by processor 152 to classify the network traffic into a category of malware activity. Once the ML model analyzes the network traffic for malware activity, a classification may be used to classify the network traffic into a category of malware activity. Various classifications may be used for this purpose. For example, a binary classification may be used to classify network traffic into two categories of malware activities: "attack" or "benign" The "attack" category may be used to classify network traffic that indicates that there was some type of attack from an infected device (e.g., IoT device 104) to another host. Network traffic from the IoT device 104 may be analyzed for payload and behavior to determine whether it tried to take advantage of some vulnerable service. In response to an affirmative determination, the network traffic is classified under "attack" malware activity. The "benign" category may be used to classify network traffic that indicates no suspicious or malicious activities.

In another example, a multiclass classification (i.e. three or more classes) may be used to classify network traffic into multiple categories of malware activities: "attack", "activity", or "benign". The "attack" and "benign" categories were described earlier. In an example, the "activity" category may be used to classify network traffic that indicates that an infected IoT device (e.g., IoT device 104) was connected to a Command and Control (CC) server. A Command and Control (C&C) server is a computer controlled by an attacker that is used as a command center to send commands to systems that have been infected with malware. In another example, the "activity" category may be used to classify network traffic from an infected IoT device that indicates that the IoT device 104 made periodic connections to a suspicious server that might host malware. In yet another example, the "activity" category may be used to classify network traffic from an infected IoT device that indicates that the IoT device downloaded binaries from a suspicious server.

Once the network traffic has been classified into a category of malware activity, instructions 168 may be executed by processor 152 to determine the effectiveness of network traffic classification. The determination may be performed by measuring a deviation of the network parameters from previously trained network parameters that were used for training the machine learning model. In an example, the deviation may provide a measure of the effectiveness of a network traffic's classification into a category of malware activity. The deviation may help account for variations in network traffic that may likely occur in a real-world network deployment. In some examples, the deviation may be measured by calculating a Euclidian distance between the network parameters and the trained network parameters.

The Euclidean distance between two points in Euclidean space is the length of a line segment between the two points. It can be calculated from the Cartesian coordinates of the points using the Pythagorean Theorem. Euclidean distance can be used to calculate the distance between two vectors (e.g., network parameters and trained network parameters).

Instructions 170 may be executed by processor 152 to determine a deviation of the network parameters from the trained network parameters. In response to a determination that the deviation of the network parameters from the trained network parameters is less than a pre-defined threshold, both may be treated as belonging to the same category. It may imply that the network parameters used during the analysis are similar to the trained network parameters and, hence, classification of the network traffic into a category of malware activity is reliable. However, in response to a determination that the deviation is more than a pre-defined threshold, the network parameters that are used during analysis may be treated as novel network parameters (i.e. those relating to a new type of network traffic) compared to the trained network parameters that were used for training the machine learning model. The presence of novel network parameters may indicate a change in the network configuration and/or network infrastructure after the deployment of the machine learning model to analyze the network traffic received from the IoT device 104. In such a case, it may imply that the network parameters used during the analysis may not be similar to the trained network parameters and, hence, classification of the network traffic into a category of malware activity may require further analysis.

In an example, in response to a determination that the deviation is more than a pre-defined threshold, instructions 170 may be executed by processor 152 to generate an alert highlighting the deviation. The alert may be used to perform a variety of actions. In some examples, the alert may allow a user to perform a remedial action pertaining to the IoT device 104. An example remedial action may include sending a power shutdown event to the IoT device (e.g., through a Power over Ethernet (PoE) system) for shutting down its power supply. The power shutdown causes erasure of a memory (e.g., RAM) associated with the IoT device, which may result in the removal of malware present therein. A PoE system is used to pass electric power along with data on twisted-pair Ethernet cabling. This allows a single cable to provide both data connection and electric power to devices such as IoT devices 102, 104, and/or 106.

In other examples, the alert may allow a remedial action pertaining to the network device 108. For example, network device 108 may redirect the network traffic found to include malware activity to a firewall. A benefit of such remedial action is that the entire network traffic from the IoT device is not sent to a firewall, merely that traffic that is found malicious.

In an example, the remedial action may include retraining the machine learning model. A retraining of the machine learning model may be useful in a scenario if no new network parameters are observed in the network traffic and some network parameters are observed more frequently (a determination that may be based on a pre-defined value) as compared to the others. In such a case the machine learning model may be retrained on more frequently observed network parameters to improve the accuracy of network traffic classification for malware activity.

In an example, various segments of the network traffic that are received over a periodic time interval may each be classified into a respective category of malware activity. For example, network traffic received over a period of, for example, five-minute intervals may each be classified into a respective category of malware activity. For example, 'first five-minute interval: attack"; "second five-minute interval: benign"; "third five-minute interval: attack", "fourth five-minute interval: attack", and so and so forth. Classifying segments of network traffic into various categories of malware activity in such a manner provides a level of granularity to the analysis, which may be useful in taking remedial action pertaining to the IoT device and/or the network device. In an example, after the classification of individual traffic segments, the entire network traffic may be classified into a single "majority" category of malware activity, based on a cumulative analysis of malware categories assigned to the individual traffic segments. In the context of the aforesaid example, the entire network traffic may be classified into, for example, "attack" malware activity.

In some examples, IoT devices 102, 104, and 106 may each include a sensor(s). The sensor(s) may be used to detect events or changes in the environment of the respective devices, and then provide a corresponding output. The sensor(s) may provide various types of output, for example, an electrical signal or an optical signal. Some non-limiting examples of sensors that may be present or embedded on IoT devices 102, 104, and 106 may include a pressure sensor, a motion sensor, a light sensor, an infra-red sensor, a humidity sensor, a gas sensor, an acceleration sensor, a color sensor, and a gyro sensor.

In an example, IoT devices 102, 104, and 106 may each be a Power over Ethernet (PoE) capable device. IoT devices 102, 104, and 106 may each use a PoE system to pass electric power along with data on twisted-pair Ethernet cabling. This allows a single cable to provide both data connection and electric power to IoT devices 102, 104, and 106.

IoT devices 102, 104, and 106 may use wired and/or wireless technologies for communication. Examples of wireless technologies may include Radio-frequency identification (RFID), Near-field Communication (NFC), optical tags, Bluetooth low energy (BLE), ZigBee, Thread, LTE-Advanced, and WiFi-Direct.

Figure 2:
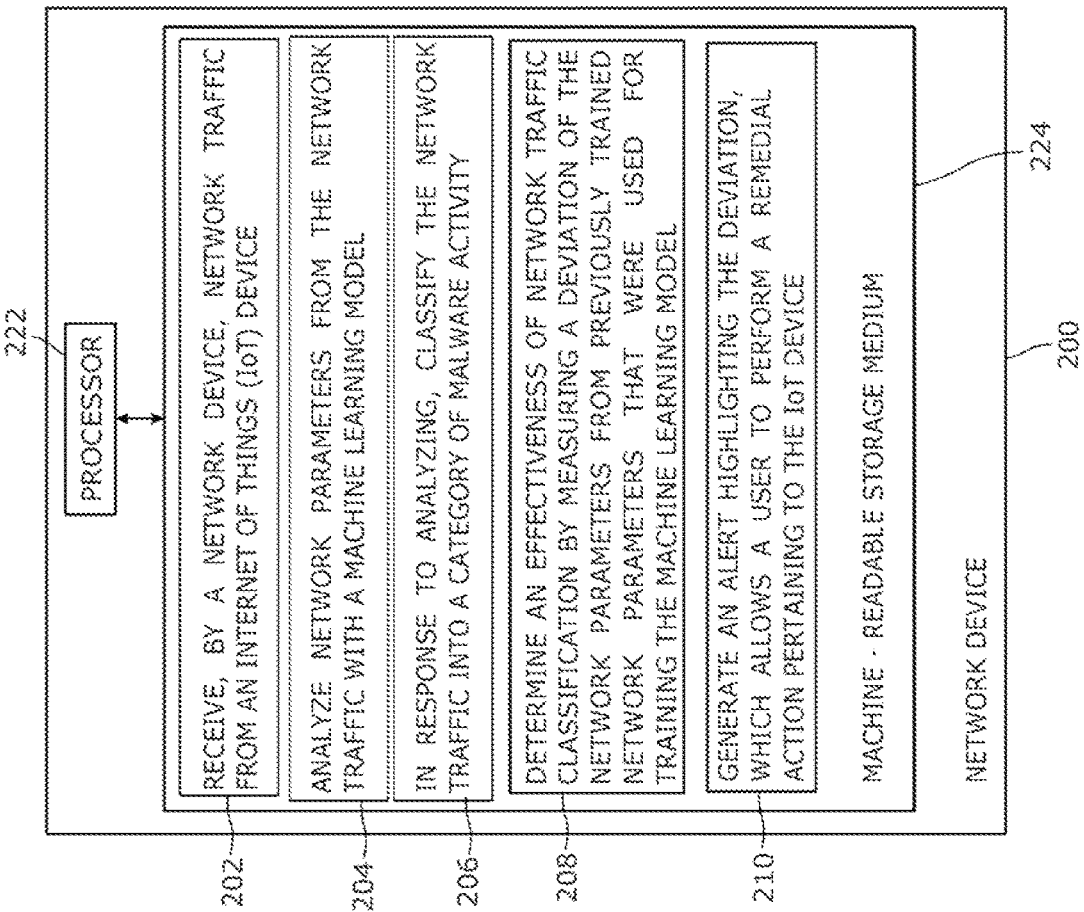
FIG. 2 is a block diagram of an example network device for classifying IoT malware, according to some examples.

FIG. 2 is a block diagram of an example network device 200 for classifying IoT malware, according to some examples.

In an example, network device 200 may be analogous to network device 108 of FIG. 1, in which like reference numerals correspond to the same or similar, though perhaps not identical, components. For the sake of brevity, components or reference numerals of FIG. 2 having the same or similarly described function in FIG. 1 are not being described in connection with FIG. 2. Said components or reference numerals may be considered alike.

Network device 200 may be responsible for receiving, forwarding, and/or routing data along a route in a computer network (e.g., computer network 110 of FIG. 1). Examples of network device 200 may include a network switch, a network router, a virtual switch, a virtual router, a VPN concentrator, and a virtual internet gateway.

In an example, network device 200 may include a processor 222 and a non-transitory machine-readable storage medium 224 communicatively coupled through a system bus. Processor 222 may be any type of Central Processing Unit (CPU), microprocessor, or processing logic that interprets and executes machine-readable instructions stored in non-transitory machine-readable storage medium 224.

Processor 222 may be any type of Central Processing Unit (CPU), microprocessor, or processing logic that interprets and executes machine-readable instructions stored in machine-readable storage medium 224. Machine-readable storage medium 224 may be a random access memory (RAM) or another type of dynamic storage device that may store information and machine-readable instructions that may be executed by processor 222. For example, machine-readable storage medium 224 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium 224 may be a non-transitory machine-readable medium.

In an example, non-transitory machine-readable storage medium 224 may store machine-readable instructions (i.e. program code) 202, 204, 206, 208, and 210 that, when executed by processor 222, may at least partially implement some or all functionalities described herein in relation to FIG. 2.

In an example, instructions 202 may be executed by processor 222 of network device 200 to receive network traffic from an Internet of Things (IoT) device (e.g., IoT device 104 of FIG. 1).

Instructions 204 may be executed by processor 222 of network device 200 to analyze network parameters from the network traffic with a machine learning model. In some examples, instructions 204 to analyze network parameters from the network traffic may include instructions to extract network parameters from the network traffic. Processor 222 may further execute instructions 204 to select a machine learning model for analyzing the network traffic for malware activity, based on the network parameters. Once the machine learning is selected, processor 222 may further execute instructions 204 to apply the machine learning model to the network parameters for analyzing the network traffic for malware activity.

In an example, the network parameters may include a native network parameter. As used herein, the term "native network parameter" refers to a network parameter that does not vary during sampling of network traffic. For example, packet length.

In an example, the network parameters may include a derived network parameter. As used herein, the term "derived network parameter" refers to a network parameter that is based on a characteristic of the network traffic. For example, flags in an IP header In an example, the machine learning model may be based on a decision tree classification model. The decision tree classification model uses a decision tree (as a predictive model) to go from observations about an item (represented in the branches) to conclusions about the item's target value (represented in the leaves). Assuming that all of the input features have finite discrete domains, and there is a single target feature called the "classification", each element of the domain of the classification is called a class. Each internal (non-leaf) node is labeled with an input feature.

In a decision tree classification model, the target variable can take a discrete set of values. In the present context, the leaves may represent class labels (e.g., malware activity classification categories such as "attack", "activity", and "benign") and branches may represent conjunctions of features (e.g., network parameters) that lead to those class labels. Examples of network parameters that may be defined may be used in the decision tree classification model may include a total number of packets exchanged between an IoT device (e.g., 104) and a network device (e.g., 108), variation in the packet length, inter-packet arrival time (the amount of time that elapses after the receipt of a packet until the next packet arrives), determining whether multiple sub-flows (using different ports) are present in the network traffic, number of flags in an IP header (e.g., PUSH flag (to ensure that the data is given priority and is processed at the sending or receiving end), SYN flag (used in first step of connection establishment phase or handshake process between two hosts), etc.), and frequency of change in packet length.

In response to the analysis, instructions 206 may be executed by processor 222 of network device 200 to classify the network traffic into a category of malware activity.

In some examples, using the decision tree classification model, network device 200 may classify network traffic into a category of malware activity, for example, "attack", "activity", and "benign". In other examples, a different classification (e.g., a binary classification) may be used to classify network traffic.

Instructions 208 may be executed by processor 222 of network device 200 to determine the effectiveness of network traffic classification by measuring a deviation of the network parameters from previously trained network parameters that were used for training the machine learning model.

In response to a determination that the deviation of the network parameters from the trained network parameters is more than a pre-defined threshold, instructions 210 may be executed by processor 222 of network device 200 to generate an alert highlighting the deviation, which may allow a user to perform a remedial action pertaining to the IoT device.

Figure 3:
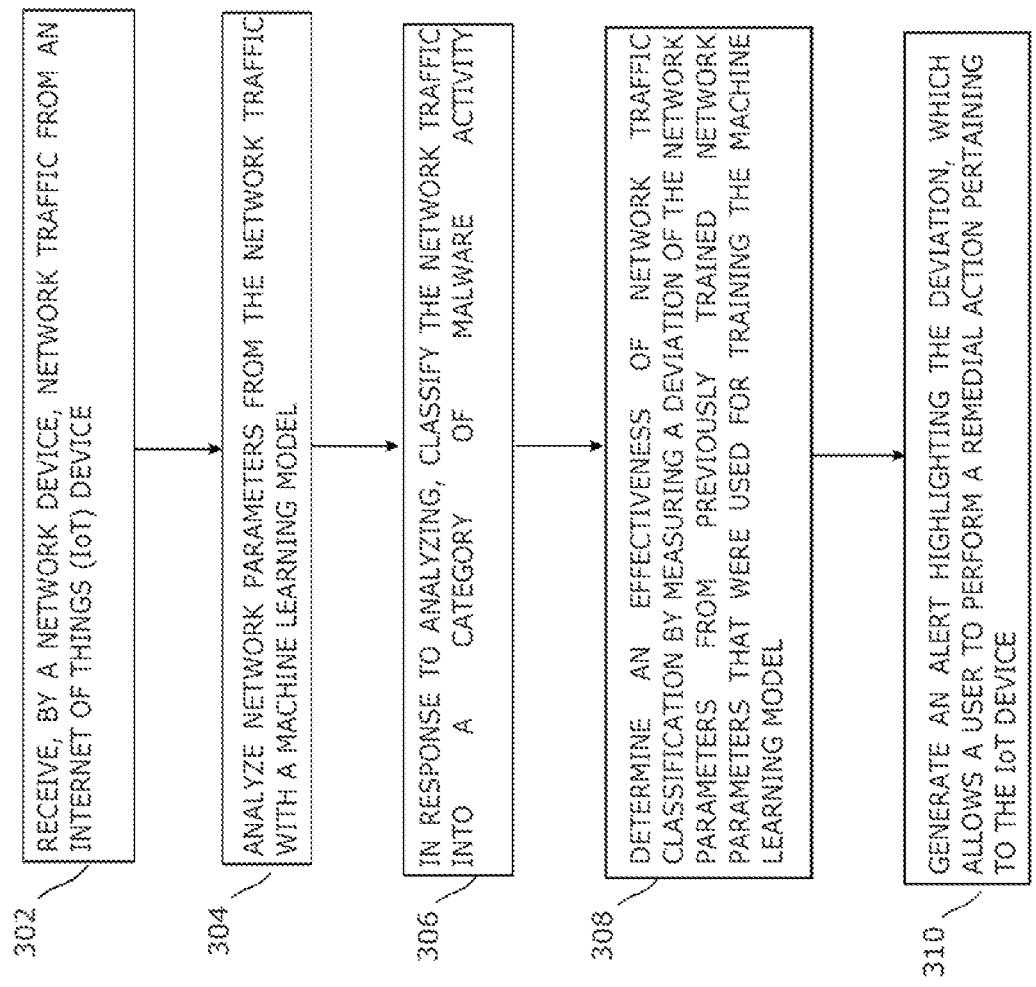
FIG. 3 is a flowchart of a method of classifying IoT malware at a network device, according to some examples.

FIG. 3 is a flowchart of a method 300 of classifying IoT malware at a network device, according to some examples. Method 300, which is described below, may at least partially be executed on network device 108 of FIG. 1 or network device 200 of FIG. 2. However, other processing devices may be used as well.

Referring to method 300, at block 302, a processor (e.g., 152 of FIG. 1) may execute instructions (e.g., 162 of FIG. 1) to receive network traffic from an Internet of Things (IoT) device. The IoT device may generate network traffic, which may be sent to a network device (e.g., network device 108 of FIG. 1) over a network. In some examples, "to receive" network traffic from the IoT device may include receiving network traffic "sent" by the IoT device to the network device. In some examples, "to receive" network traffic from the IoT device may include receiving network traffic "pulled" by the network device from the IoT device.

At block 304, processor 152 may execute instructions 164 to analyze network parameters from the network traffic with a machine learning model. An example method 400 of analyzing network parameters with a machine learning model is described in reference to FIG. 4 below.

In an example, the machine learning model may include a support vector machine (SVM) model, which is a supervised learning model with associated learning algorithms that analyze data for classification. An SVM model is a prediction method, which is based on statistical learning frameworks. Given a set of training examples, each marked as belonging to one of two categories, an SVM training algorithm builds a model that assigns new examples to one category or the other, making it a non-probabilistic binary linear classifier. SVM maps training examples to points in space to maximize the width of the gap between the two categories. New examples are then mapped into that same space and predicted to belong to a category based on which side of the gap they fall. In an example, the machine learning model may use network parameters such as packet length, packet, and bit rate (i.e. number of packets received per second) for analyzing network traffic. In response to the analysis, the network traffic may be classified into a category of malware activity based on binary classification, for example, "attack" or "benign", both of which were described earlier.

At block 306, processor 152 may execute instructions 166 to classify the network traffic into a category of malware activity.

At block 308, processor 152 may execute instructions 168 to determine the effectiveness of network traffic classification by measuring a deviation of the network parameters from previously trained network parameters that were used for training the machine learning model.

In response to a determination that the deviation of the network parameters from the trained network parameters is more than a pre-defined threshold, at block 310, processor 152 may execute instructions 170 to generate an alert highlighting the deviation, which may allow a user to perform a remedial action pertaining to the IoT device.

Figure 4:
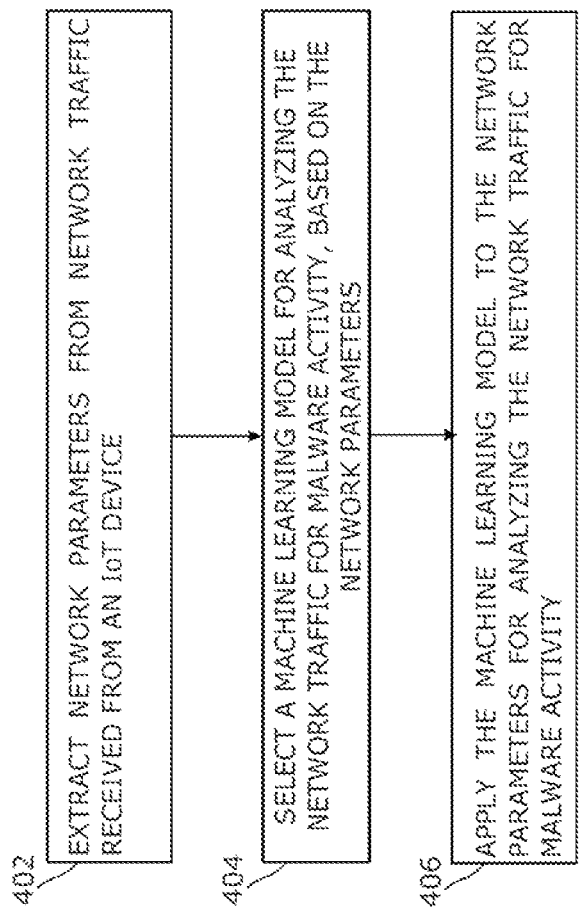
FIG. 4 is a flowchart of a method of analyzing network parameters at a network device, according to some examples.

FIG. 4 is a flowchart of a method 400 of analyzing network parameters from network traffic with a machine learning model, according to some examples. Method 400, which is described below, may at least partially be executed on network device 108 of FIG. 1 or network device 200 of FIG. 2. However, other processing devices may be used as well.

At block 402, a processor (e.g., 152 of FIG. 1) may execute instructions (e.g., instructions 164 of FIG. 1) to extract network parameters from network traffic received from an IoT device (e.g., IoT device 104 of FIG. 1).

At block 404, processor 152 may execute instructions 164 to select a machine learning model for analyzing the network traffic for malware activity, based on the network parameters.

At block 406, processor 152 may execute instructions 164 to apply the machine learning model to the network parameters for analyzing the network traffic for malware activity.

Figure 5:
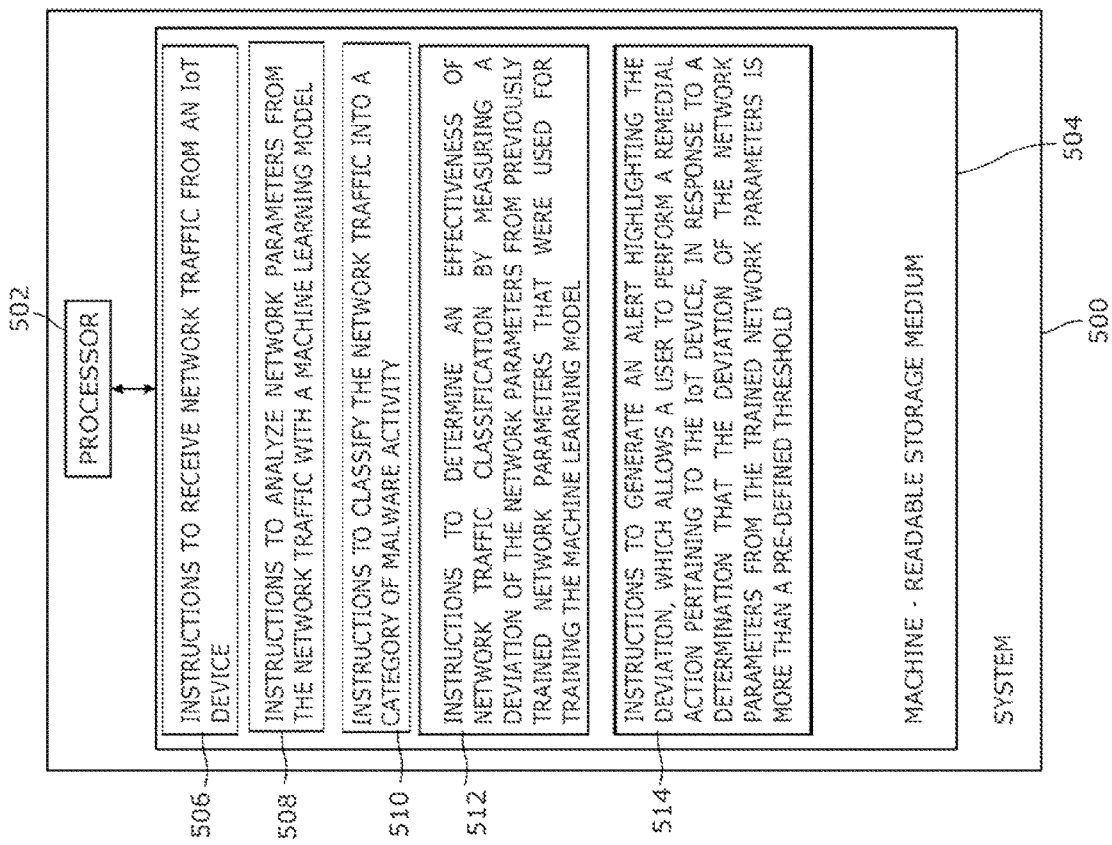
FIG. 5 is a block diagram of a system including instructions in a machine-readable storage medium for classifying IoT malware at a network device, according to some examples.

FIG. 5 is a block diagram of an example system 500 for classifying IoT malware at a network device, according to some examples. System 500 includes a processor 502 and a machine-readable storage medium 504 communicatively coupled through a system bus. In an example, system 500 may be analogous to network device 104 of FIG. 1 or network device 200 of FIG. 2. Processor 502 may be any type of Central Processing Unit (CPU), microprocessor, or processing logic that interprets and executes machine-readable instructions stored in machine-readable storage medium 504. Machine-readable storage medium 504 may be a random access memory (RAM) or another type of dynamic storage device that may store information and machine-readable instructions that may be executed by processor 502. In an example, machine-readable storage medium 504 may be a non-transitory machine-readable medium. Machine-readable storage medium 504 may store instructions 506, 508, 510, 512, and 514.

In an example, instructions 506 may be executed by processor 502 to receive network traffic from an Internet of Things (IoT) device.

Instructions 508 may be executed by processor 502 to analyze network parameters from the network traffic with a machine learning model.

Instructions 510 may be executed by processor 502 to classify the network traffic into a category of malware activity, in response to the analysis.

Instructions 512 may be executed by processor 502 to determine the effectiveness of network traffic classification by measuring a deviation of the network parameters from previously trained network parameters that were used for training the machine learning model.

Instructions 514 may be executed by processor 502 to generate an alert highlighting the deviation, which allows a user to perform a remedial action pertaining to the IoT device and/or a network device, in response to a determination that the deviation of the network parameters from the trained network parameters is more than a pre-defined threshold.

In some examples, a method is provided that includes receiving, by a network device, network traffic from an IoT device. Network device analyses network parameters from the network traffic with a machine learning model. In response to analyzing, the network device classifies the network traffic into a category of malware activity. The network device determines the effectiveness of network traffic classification by measuring a deviation of the network parameters from previously trained network parameters that were used for training the machine learning model. In response to a determination that the deviation of the network parameters from the trained network parameters is more than a pre-defined threshold, the network device generates an alert highlighting the deviation, which allows a user to perform a remedial action pertaining to the IoT device.

In some examples, a system is to receive network traffic from an IoT device. The system analyses network parameters from the network traffic with a machine learning model. In response to analyzing, the system classifies the network traffic into a category of malware activity. The system determines the effectiveness of network traffic classification by measuring a deviation of the network parameters from previously trained network parameters that were used for training the machine learning model. In response to a determination that the deviation of the network parameters from the trained network parameters is more than a pre-defined threshold, the system generates an alert highlighting the deviation, which allows a user to perform a remedial action pertaining to the IoT device.

In some examples, a non-transitory machine-readable storage medium includes instructions to receive network traffic from an IoT device. The instructions analyze network parameters from the network traffic with a machine learning model. In response to analyzing, instructions classify the network traffic into a category of malware activity. Instructions then determine an effectiveness of network traffic classification by measuring a deviation of the network parameters from previously trained network parameters that were used for training the machine learning model. In response to a determination that the deviation of the network parameters from the trained network parameters is more than a pre-defined threshold, instructions generate an alert highlighting the deviation, which allows a user to perform a remedial action pertaining to the IoT device.

For the purpose of simplicity of explanation, the example methods of FIGS. 3 and 4 are shown as executing serially, however, it is to be understood and appreciated that the present and other examples are not limited by the illustrated order. The example systems of FIGS. 1, 2, and 5, and methods of FIGS. 3 and 4 may be implemented in the form of a computer program product including computer-executable instructions, such as program code, which may be run on any suitable computing device in conjunction with a suitable operating system (for example, Microsoft Windows®, Linux®, UNIX®, and the like). Examples within the scope of the present solution may also include program products comprising non-transitory computer-readable media for carrying or having computer-executable instructions or data structures stored thereon. Such computer-readable media can be any available media that can be accessed by a general-purpose or special-purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general-purpose or special-purpose computer. The computer-readable instructions can also be accessed from memory and executed by a processor.

It should be understood that the above-described examples of the present solution are for the purpose of illustration only. Although the solution has been described in conjunction with a specific example thereof, numerous modifications may be possible without materially departing from the teachings and advantages of the subject matter described herein. Other substitutions, modifications, and changes may be made without departing from the spirit of the present solution. All of the features disclosed in this specification (including any accompanying claims, abstract, and drawings), and/or all of the steps of any method or process so disclosed, may be combined in any combination, except combinations where at least some of such features and/or steps are mutually exclusive.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

As used herein, a phrase referring to "at least one of" a list of items refers to any combination of those items, including single members. As an example, "at least one of: a, b, or c" is intended to cover a, b, c, a–b, a–c, b–c, and a–b–c, as well as any combination with multiple of the same item.

As used herein, the articles "a" and "an" are intended to include one or more items and may be used interchangeably with "one or more." Further, as used herein, the article "the" is intended to include one or more items referenced in connection with the article "the" and may be used interchangeably with "the one or more." Also, as used herein, the terms "has," "have," "having," or the like are intended to be open-ended terms. As used herein, the term "includes" is intended to mean "includes but not limited to", and the term "including" is intended to mean "including but not limited to". Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The invention claimed is:

1. A method comprising:
receiving, by a network device, network traffic from an Internet of Things (IoT) device;
analyzing, by the network device, network parameters from the network traffic with a machine learning model;
in response to analyzing, classifying, by the network device, the network traffic into a category of malware activity;
determining, by the network device, an effectiveness of network traffic classification by measuring a deviation of the network parameters from previously trained network parameters that were used for training the machine learning model, wherein the effectiveness is indicative of a reliability of the classifying of the network traffic into a category of malware activity, wherein the deviation is measured by calculating a Euclidian distance between the network parameters and the trained network parameters;
determining that the deviation of the network parameters from the trained network parameters is more than a defined threshold deviation; and
in response to the determination that the deviation of the network parameters from the trained network parameters is more than the defined threshold deviation, generating, by the network device, an alert highlighting the deviation, which allows a user to perform a remedial action pertaining to the IoT device.

2. The method of claim 1, wherein analyzing comprises:
extracting, by the network device, the network parameters from the network traffic;
based on the network parameters, selecting, by the network device, the machine learning model; and
applying, by the network device, the machine learning model to the network parameters for analyzing the network traffic for malware activity.

3. The method of claim 1, wherein analyzing comprises analyzing, by the network device, segments of the network traffic received over a periodic time interval.

4. The method of claim 3, further comprising, classifying, by the network device, each of the segments of the network traffic into a respective category of malware activity.

5. The method of claim 1, wherein the category of malware activity is part of a binary classification used for classifying malware activities.

6. The method of claim 1, wherein the category of malware activity is part of a multiclass classification used for classifying malware activities.

7. The method of claim 1, wherein the network device is a network switch.

8. The method of claim 1, wherein the remedial action includes sending a power shutdown event to the IoT device, wherein the power shutdown event causes erasure of a memory.

9. The method of claim 1, wherein the machine learning model is selected based on the network parameters.

10. A network device comprising:
a hardware processor; and
a machine-readable medium storing instructions that, when executed by the hardware processor, cause the hardware processor to:
receive network traffic from an Internet of Things (IoT) device;
analyze network parameters from the network traffic with a machine learning model;
in response to analysis, classify the network traffic into a category of malware activity;
determine an effectiveness of network traffic classification by measuring a deviation of the network parameters from previously trained network parameters that were used for training the machine learning model;
determine that the deviation of the network parameters from the trained network parameters is more than a defined threshold deviation; and
in response to the determination that the deviation of the network parameters from the trained network parameters is more than the defined threshold deviation, generate an alert highlighting the deviation, which allows a user to perform a remedial action pertaining to the IoT device or the network device, wherein the remedial action includes sending a power shutdown event to the IoT device, wherein the power shutdown event causes erasure of a memory.

11. The network device of claim 10, wherein the network parameters include a native network parameter that is part of a network packet in the network traffic.

12. The network device of claim 10, wherein the network parameters include a derived network parameter that is based on a characteristic of the network traffic.

13. The network device of claim 10, wherein the machine learning model is selected based on the network parameters.

14. The network device of claim 10, wherein the machine learning model is based on a decision tree classification model.

15. A non-transitory machine-readable storage medium comprising instructions, the instructions executable by a processor of a system to:
   receive network traffic from an Internet of Things (IoT) device;
   analyze network parameters from the network traffic with a machine learning model, wherein the machine learning model is selected based on the network parameters;
   in response to analysis, classify the network traffic into a category of malware activity;
   determine an effectiveness of network traffic classification by measuring a deviation of the network parameters from previously trained network parameters that were used for training the machine learning model, wherein the deviation is measured by calculating a Euclidian distance between the network parameters and the trained network parameters; and
   in response to a determination that the deviation of the network parameters from the trained network parameters is more than a defined threshold deviation, generate an alert highlighting the deviation, which allows a user to perform a remedial action pertaining to the IoT device.

16. The storage medium of claim 15, wherein the machine learning model is based on a Support Vector Machine (SVM) model.

17. The storage medium of claim 15, wherein the IoT device is a Power over Ethernet (POE) capable device.

18. The storage medium of claim 15, wherein the remedial action includes retraining the machine learning model.

19. The storage medium of claim 15, wherein the remedial action includes redirecting the network traffic to a firewall.

* * * * *